United States Patent

Chin-Shung

[11] Patent Number: 5,308,103
[45] Date of Patent: May 3, 1994

[54] COLLAPSIBLE LUGGAGE TROLLEY

[76] Inventor: Liu Chin-Shung, 2F, No. 6 Lane 75 Sec. 4 Minsheng E. Road, Taipei, Taiwan

[21] Appl. No.: 92,617

[22] Filed: Jul. 16, 1993

[51] Int. Cl.$^5$ ............................................. B62B 1/12
[52] U.S. Cl. ................................. 280/655; 280/655.1; 280/47.29
[58] Field of Search ............... 280/645, 652, 654, 655, 280/655.1, 47.27, 47.28, 47.29, 47.315, 47.371

[56] References Cited

U.S. PATENT DOCUMENTS

| | | | |
|---|---|---|---|
| 3,998,476 | 12/1976 | Kazmark, Sr. | 280/47.315 X |
| 4,546,995 | 10/1985 | Kassai | 280/47.29 X |
| 4,591,183 | 5/1986 | Gordon et al. | 280/47.29 X |
| 4,896,897 | 1/1990 | Wilhelm | 280/47.29 X |
| 4,953,888 | 9/1990 | Stein | 280/47.29 X |
| 4,974,871 | 12/1990 | Mao | 280/47.371 X |
| 5,024,458 | 6/1991 | Kazmark et al. | 280/47.29 X |
| 5,127,664 | 7/1992 | Cheng | 280/47.29 X |
| 5,178,404 | 1/1993 | Chen | 280/655 |
| 5,257,800 | 11/1993 | Yang | 280/47.29 X |

FOREIGN PATENT DOCUMENTS

| | | | |
|---|---|---|---|
| 4-183672 | 6/1992 | Japan | 280/654 |
| 4-183673 | 6/1992 | Japan | 280/654 |
| 4-183674 | 6/1992 | Japan | 280/654 |
| 4-183675 | 6/1992 | Japan | 280/654 |

Primary Examiner—Brian L. Johnson
Attorney, Agent, or Firm—Bacon & Thomas

[57] ABSTRACT

A collapsible luggage trolley includes a wheeled base from which two parallel posts extend upward with a handhold mounted on the free ends thereof and a middle support member connected between the posts at a middle position thereof. Each of the posts has a lower, a middle and an upper tubular section telescopically received within each other and retained in the expanded position by the first and second retaining pins which are biased to extend through holes formed on the tubular sections. A plug movably received within the upper section is connected to a release bar disposed within the handhold by a link to allow the plug to be controlled by the release bar. A cavity is formed inside the plug for receiving therein the first retaining pin between the upper section and the middle section. An inclined camming surface is provided within the cavity so that when the plug is moved by the release bar, the camming surface acts upon the first retaining pin to withdraw it for releasing the retaining engagement between the upper section and the middle section. The plug has a round-headed lower end projecting out of the upper section and into the middle section which when moved to contact the second retaining pin between the middle section and the lower section acts upon and moves it back to break the retaining engagement between the middle section and the lower section.

5 Claims, 4 Drawing Sheets

COLLAPSIBLE LUGGAGE TROLLEY

FIELD OF THE INVENTION

The present invention relates generally to a collapsible luggage trolley and in particular to one having an improved release mechanism.

BACKGROUND OF THE INVENTION

Luggage trolleys are very helpful for travellers who carry heavy luggage. To save storage space, the luggage trolley that is currently available in the market comprises a collapsible structure, namely a wheeled base with telescopic posts extending therefrom. The posts are usually constituted by three tubular sections telescoping into each other. Release mechanisms are provided to release the retaining engagement between the tubular sections to collapse the posts from the expanded condition to the collapsed condition.

One of the disadvantages of the currently available luggage trolleys is the complexity of the release mechanism thereof. Such a complicated release mechanism requires a greater manufacturing cost and a more sophisticated manufacturing process. Therefor, it is desirable to have a simple release mechanism for the collapsible luggage trolleys to save the cost and simplify the manufacturing process.

SUMMARY OF THE INVENTION

It is therefore the principal objective of the present invention to provide a collapsible luggage trolley comprising a simple release mechanism for saving manufacturing cost and simplifying manufacturing process.

To achieve the above objective, there is provided a collapsible luggage trolley comprising a wheeled base from which two parallel posts extend upward with a handhold mounted on the free ends thereof and a middle support member connected between the posts at a middle position thereof. Each of the posts has a lower, a middle and an upper tubular section telescopically received within each other and retained in the expanded position by the first and second retaining pins which are biased to extend through holes formed on the tubular sections. A plug movably received within the upper section is connected to a release bar disposed within the handhold by a link to allow the plug to be controlled by the release bar. A cavity is formed inside the plug for receiving therein the first retaining pin between the upper section and the middle section. An inclined camming surface is provided within the cavity so that when the plug is moved by the release bar, the camming surface acts upon the first retaining pin to withdraw it for releasing the retaining engagement between the upper section and the middle section. The plug has a round-headed lower end projecting out of the upper section and into the middle section which when moved to contact the second retaining pin between the middle section and the lower section acts upon and moves it back to break the retaining engagement between the middle section and the lower section.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENT

Figure 1:
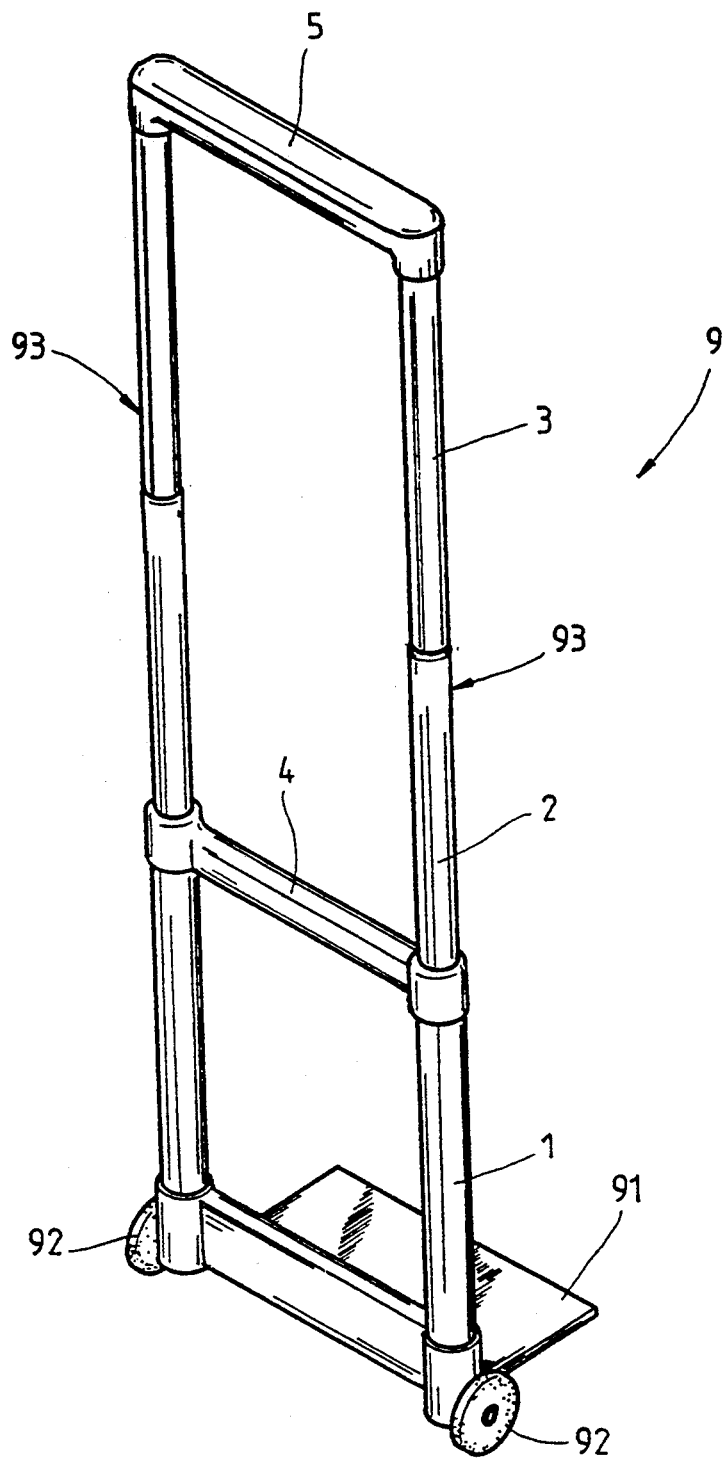
FIG. 1 is a perspective view showing a collapsible luggage trolley constructed in accordance with the preferred embodiment of the present invention.

With reference to the drawings and in particular to FIG. 1, wherein a collapsible luggage trolley constructed in accordance with the present invention, generally designated with the reference numeral 9, is shown, the collapsible luggage trolley 9 comprises a base support 91 on which a pair of casters or wheels 92 are mounted for rollingly supporting the luggage trolley 9 on ground. Two posts 93, each of which comprises a lower tubular section 1, a tubular middle section 2 and a tubular upper section 3 telescoping into each other, extend from the base 91 in a substantially parallel manner.

On the free ends of the posts 93, a handhold 5, which is a hollow member defining therein a first interior space, is mounted therebetween. A middle support member 4, which is a hollow member defining therein a second interior space, is connected between the posts 93 at the connection between the middle section 2 and the lower section 1 for supporting a luggage (not shown) on the base 91.

Figure 2:
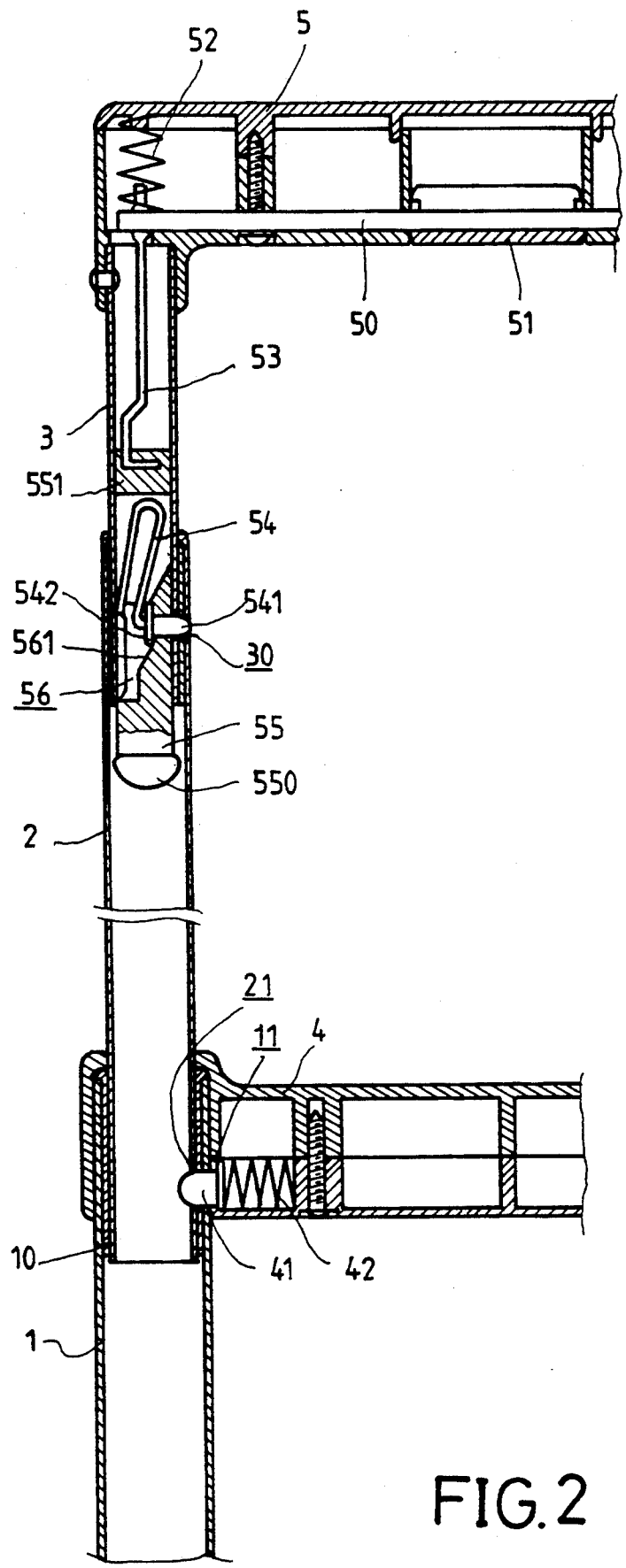
FIG. 2 is a partial cross-sectional view showing the release mechanism of the collapsible luggage trolley shown in FIG. 1 in an expanded condition.
Figure 3:
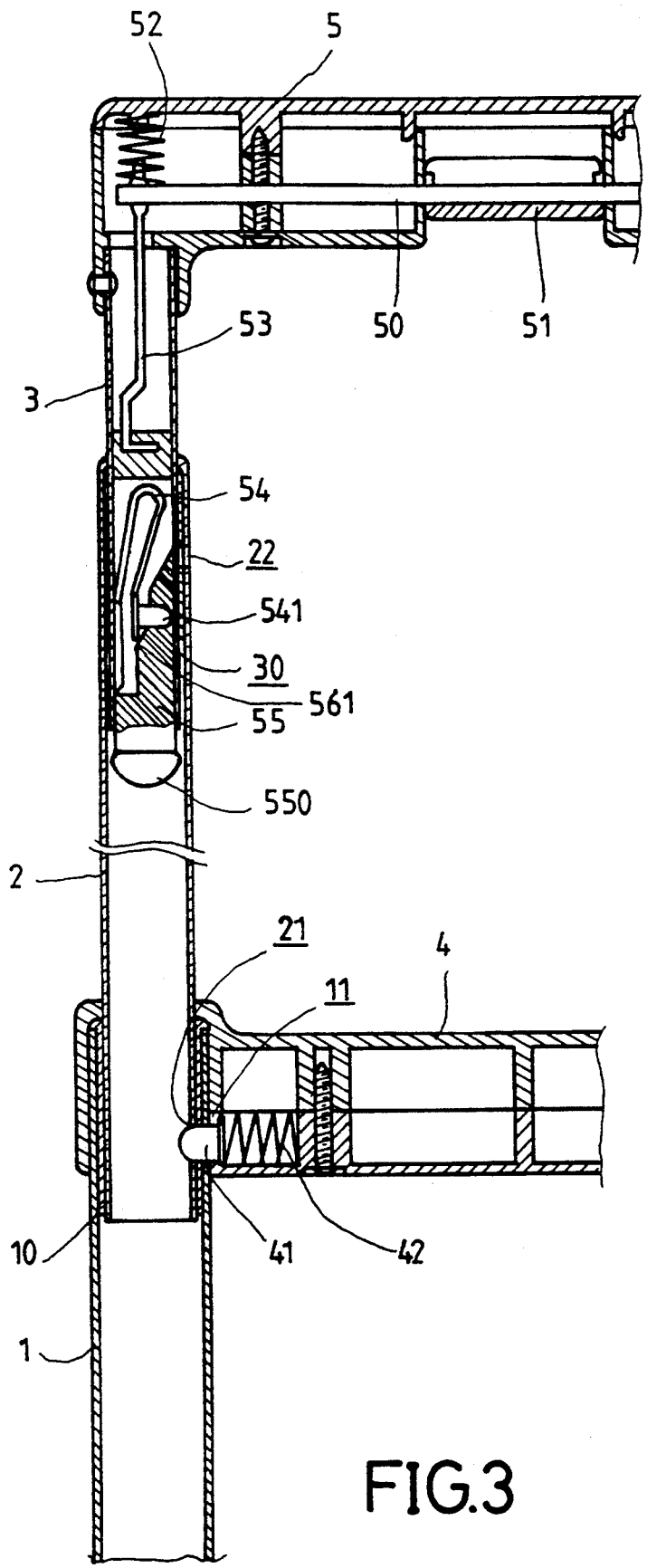
FIG. 3 is a partial cross-sectional view showing the release mechanism of the collapsible luggage trolley shown in FIG. 1 in a partially collapsed condition.
Figure 4:
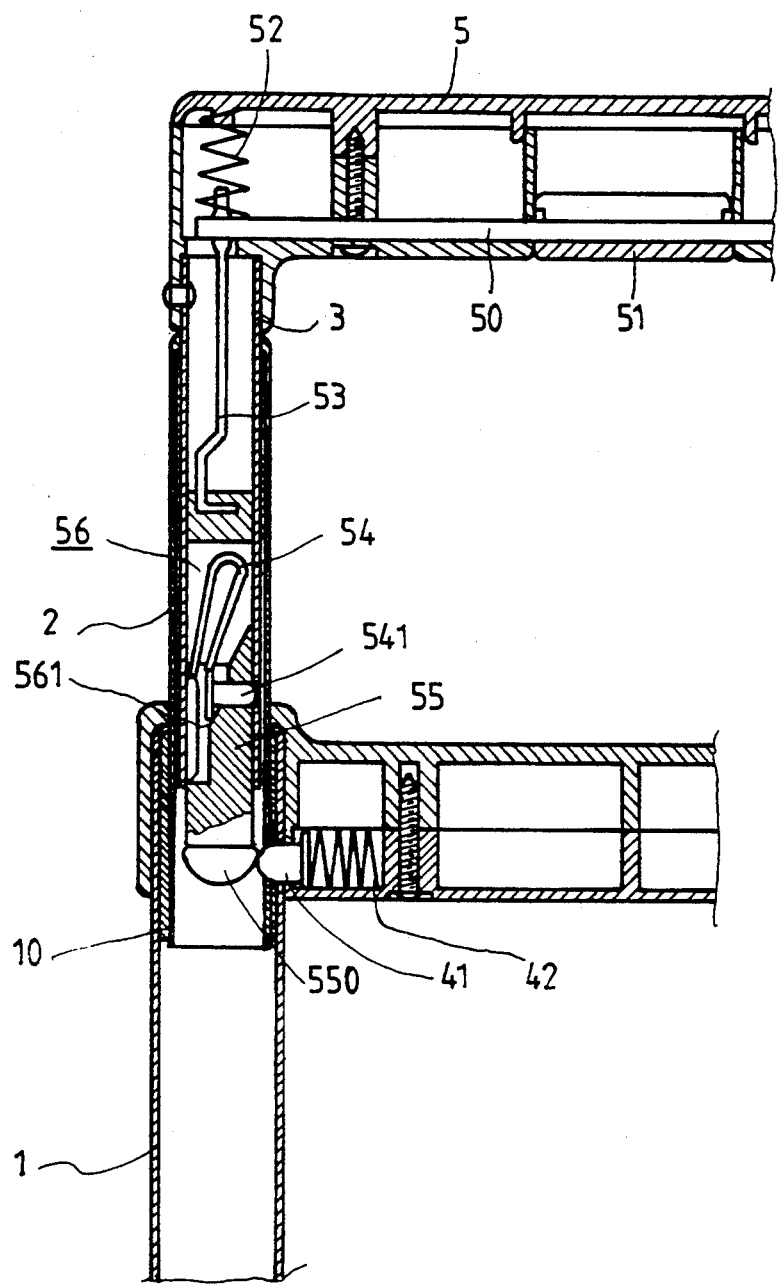
FIG. 4 is a partial cross-sectional view showing the release mechanism of the collapsible luggage trolley shown in FIG. 1 in a further collapsed condition.

With reference to FIGS. 2-4, wherein the release mechanism of the luggage trolley for releasing the posts 93 from the expanded condition is shown, the release mechanism comprises a release bar 50 which is deposed within the first interior space and biased by spring means 52 to abut against the bottom of the handhold 5. The bottom of the handhold 5 has a portion 51 separated therefrom to be moveable relative thereto so as to allow a user to act on the release bar 50 by pushing or depressing the separated portion 51 against the spring means 52.

Disposed inside the upper section 3 of each of the posts 93 is upper release means which comprises an elongated plug 55 which is loosely and thus movably fit in the upper section 3 to have an expanded round-headed lower end 550 thereof project out of the lower end of the upper section 3 and extend into the middle section 2 from the upper end thereof. The plug 55 has an upper end portion 551 opposite to the expanded end 550 thereof, disposed within the upper section 3, to be connected to the release bar 50 by a link member 53. Since the plug member 55 is loosely fit in the upper section 3, by moving the release bar 50 against the spring means 52, the plug 55 is moved within the upper section 3.

The plug 55 has a cavity 56 defined therein to receive first pin biasing means 54. In the embodiment illustrated, the first pin biasing means 54 is a substantially U-shaped leave spring with a first end thereof secured to the upper section 3 and a second end defining a first retaining pin 541 thereon. The first retaining pin 541 is biased to extend through a hole 30 formed in the proximity of the lower end of the upper section 3 and a corresponding first hole 22 formed on an upper end of the middle section 2 so as to engage the upper section 3 to the middle section 2 and thus retain the middle section 2 and the upper section 3 in the expanded condition.

Inside the cavity 56 defined within the plug 55, an inclined camming surface 561 is formed to be in contact engagement with a base 542 of the first retaining pin 541 so that when the plug 55 is moved toward the handhold 5 by depressing of the release bar 50, the camming surface 561 acts upon the base 542 of the first retaining pin 541 to withdraw the first retaining pin 541 back into the cavity 56 to release the engagement between the middle section 2 and the upper section 3.

The release mechanism of the present inventive luggage trolley further comprises lower release means disposed within the second interior space defined within the middle support member 4. The lower release means comprises a second retaining pin 41 biased by a second pin biasing means 42 to extend through a hole 11 formed on an upper end of the lower section 1 and a second hole 21 formed on a lower end of the middle section 2 to engage the middle section 2 to the lower section 1 and thus retain them in the expanded condition. In the embodiment illustrated, the second pin biasing means 42 is a coil spring mounted between second retaining pin 41 and a support plated formed inside the second interior space defined within the middle support member 4.

In releasing the engagement between the middle section 2 and the lower section 1, the upper section 3 together with the plug 55 is moved down toward the second retaining pin 41 to have the round-headed lower end 550 of the plug 55 contact and act upon the second retaining pin 41 so as to move the second retaining pin 41 against the spring 42 and thus breaking the engagement between the lower and middle sections 1 and 2.

Preferably, the retaining pins 41 and 541 comprise a rounded end.

The collapse of the posts 93 from the fully expanded condition shown in FIG. 2 to the collapsed conditions shown in FIGS. 3 and 4 is accomplished by depressing the release bar 50 through the separated portion 51 of the bottom of the handhold 5, as shown in FIG. 3, to move the plugs 55 disposed within the upper sections 3 to release the engagement between the upper and middle sections 2 and 3 of both posts 93. Once the upper sections 3 are telescopically moved into the middle sections 2, the round-headed lower ends 550 of the plugs 55 are allowed to contact the second retaining pins 41 to break the engagement between the middle and lower sections 2 and 1 and thus allowing the middle sections 2, with the upper sections 3 completely received therein, to be telescoped into the lower sections 1.

Preferably, a protective sleeve member 10 is disposed within each of the upper ends of the lower and the middle section 1 and 2 with the middle and the upper sections 2 and slidably inserted therein.

It is apparent that although the invention has been described in connection with the preferred embodiment, it is contemplated that those skilled in the art may make changes to certain features of the preferred embodiment without altering the basic concept of the invention and without departing from the spirit and scope of the invention as defined in the appended claims.

What is claimed is:

1. A collapsible luggage trolley comprising:

a base having wheels mounted thereon for rollingly supporting said collapsible luggage trolley on ground;

two substantially parallel side posts extending upward from said base with a handhold mounted between free ends thereof and a middle support member connected between said posts at a middle position thereof, said handhold having a first interior space defined therein, said middle support member having a second interior space defined therein;

each of said posts comprising a lower tubular section mounted at a lower end thereof on said base, a middle tubular section telescopically received within said lower section, and an upper tubular member telescopically received within said middle section, said handhold being mounted to an upper end of said upper section which constitutes the free end of the respective post and said upper section having a hole formed in the proximity of a lower end thereof, said middle support member being connected to an upper end of said lower section with a hole formed in the proximity of the upper end of said lower section to be in communication with the second interior space defined within said middle support member, said middle section having an upper end and an opposite lower end, each having a hole formed thereon respectively corresponding to the holes formed on said upper section and said lower section;

first release means comprising a release bar movably disposed within the first interior space defined within said handhold and biased by first biasing means to abut against a bottom of said handhold, said bottom having a portion separated therefrom and movable relative thereto for depressing said release bar against said first biasing means, said first release means further comprising a plug movably fit into each of said upper sections with a lower end thereof projecting out of the lower end of the upper section and into said middle section, said plug having an opposite upper end connected to said release bar by a linking member so that by depressing the release bar, the plug is moved within the upper section, said plug defining therein a cavity having an inclined camming surface formed therein;

first engaging means comprising a first retaining pin biased by first pin biasing means disposed in the cavity defined within said plug to extend through the hole of the upper section and the hole formed on the upper end of the middle section to retainingly engage the upper section and the middle section to each other to be in a relative expanded condition, said first retaining pin being disposed within the cavity so as to be in contact engagement with the camming surface and thus be withdrawn out of the holes through which the first retaining pin extends by the camming surface when the plug is moved by said release bar to break the retaining engagement between the upper section and the middle section;

a second retaining pin disposed within the second interior space defined within said middle support member and biased by second pin biasing means to extend through the hole of the lower section and the hole formed on the lower end of the middle section so as to retainingly engage the middle section and the lower section to each other to be in a relative expanded condition; and second release means comprising an expanded, round-headed end portion formed on the lower end of said plug so that when the upper section is released to telescope into the middle section by the depressing of said release bar, the round-headed end of said plug contacts and acts upon the second retaining pin to force the second retaining pin into the second interior space to break the retaining engagement between the middle section and the lower section.

2. A collapsible luggage trolley as claimed in claim 1, wherein each of said middle section and lower section has a protective sleeve member disposed within the upper end thereof respectively with the upper section and the middle section slidably received therein.

3. A collapsible luggage trolley as claimed in claim 1, wherein each of said first and second retaining pins has a rounded end to penetrate the holes formed on the upper, middle and lower sections.

4. A collapsible luggage trolley as claimed in claim 1, wherein said first pin biasing means comprises a U-shaped leave spring.

5. A collapsible luggage trolley as claimed in claim 1, wherein said second pin biasing means comprises a coil spring.

* * * * *